United States Patent
Nakamura

(10) Patent No.: US 9,891,870 B2
(45) Date of Patent: Feb. 13, 2018

(54) INFORMATION PROCESSING APPARATUS, INFORMATION PROCESSING METHOD, RECORDING MEDIUM, AND INFORMATION PROCESSING SYSTEM

(71) Applicant: Shuuichi Nakamura, Kanagawa (JP)

(72) Inventor: Shuuichi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/249,865

(22) Filed: Aug. 29, 2016

(65) Prior Publication Data

US 2017/0068492 A1 Mar. 9, 2017

(30) Foreign Application Priority Data

Sep. 3, 2015 (JP) .................................. 2015-174164
Jun. 10, 2016 (JP) .................................. 2016-116067

(51) Int. Cl.
*G06F 3/12* (2006.01)
*H04N 1/00* (2006.01)

(52) U.S. Cl.
CPC .......... *G06F 3/1212* (2013.01); *G06F 3/1236* (2013.01); *G06F 3/1273* (2013.01); *G06F 3/1286* (2013.01); *H04N 1/00408* (2013.01); *H04N 2201/0094* (2013.01)

(58) Field of Classification Search
CPC .................................................... G06F 3/1212
USPC ........................................................ 358/1.15
See application file for complete search history.

(56) References Cited

U.S. PATENT DOCUMENTS

| | | | |
|---|---|---|---|
| 2011/0032563 A1* | 2/2011 | Matsuzawa | H04N 1/00222 358/1.15 |
| 2011/0188064 A1* | 8/2011 | Awata | G06F 3/12 358/1.13 |
| 2014/0320891 A1* | 10/2014 | Kato | G06F 3/126 358/1.15 |
| 2015/0082457 A1 | 3/2015 | Nakamura et al. | |
| 2015/0365481 A1 | 12/2015 | Nakamura | |

FOREIGN PATENT DOCUMENTS

| | | |
|---|---|---|
| JP | 2009-294889 | 12/2009 |
| JP | 2010-181948 | 8/2010 |

* cited by examiner

*Primary Examiner* — Jacky X Zheng
(74) *Attorney, Agent, or Firm* — Harness, Dickey & Pierce

(57) ABSTRACT

An information processing apparatus includes: a history information acquiring unit configured to acquire history information on print outputs from a server; a statistics processing unit configured to extract at least one image forming apparatus with a high usage ratio based on the acquired history information; a device information acquiring unit configured to acquire device information related to an availability condition of the extracted at least one image forming apparatus directly from the at least one image forming apparatus; and a display processing unit configured to display information related to the acquired availability condition.

7 Claims, 10 Drawing Sheets

FIG.11

| PRINTER DRIVER | | | | | | | | _ □ X |
|---|---|---|---|---|---|---|---|---|
| GENERAL | SHARE | PORT | DETAILED SETTING | COLOR MANAGEMENT | SECURITY | SHEET SIZE | APPLICATION SETTINGS | DEVICES USED IN PAST AND CURRENT STATUS |

LIST OF MULTIFUNCTIONAL PERIPHERALS USED UP TO NOW

| TIME AND DATE OF USAGE | TOTAL USAGE COUNT | DEVICE NAME | IP ADDRESS | CURRENT REACHABILITY |
|---|---|---|---|---|
| 2015/04/03 01:23:45+900 | 234 | DEVICE NAME | 192.168.10.110 | REACHABLE |
| 2015/04/01 12:23:34+900 | 50 | DEVICE NAME | 192.168.10.150 | REACHABLE |
| 2015/03/29 20:44:47+900 | 102 | DEVICE NAME | 192.168.10.120 | REACHABLE |

CURRENT STATUS: AVAILABLE ANY TIME

| ITEM | CURRENT CONDITION |
|---|---|
| DEVICE CONDITION | NORMAL |
| DETAILED DEVICE CONDITION | IDLE |
| PRINTER CONDITION | AVAILABLE |
| CURRENT ERROR CONDITION | NONE |
| SHEET CONDITION | NORMAL |
| TRAY 1 (A4) | NORMAL |
| TRAY 1 (A3) | NORMAL |
| TONER CONDITION | NORMAL |
| TONER (B) | 57% |
| TONER (C) | 80% |
| TONER (Y) | 92% |
| TONER (M) | 75% |

INFORMATION PROCESSING APPARATUS, INFORMATION PROCESSING METHOD, RECORDING MEDIUM, AND INFORMATION PROCESSING SYSTEM

CROSS-REFERENCE TO RELATED APPLICATIONS

The present application claims priority under 35 U.S.C. § 119 to Japanese Patent Application No. 2015-174164, filed Sep. 3, 2015 and Japanese Patent Application No. 2016-116067, filed Jun. 10, 2016. The contents of which are incorporated herein by reference in their entirety.

BACKGROUND OF THE INVENTION

1. Field of the Invention

The present invention relates to an information processing apparatus, an information processing method, a recording medium, and an information processing system.

2. Description of the Related Art

Recently, a function referred to as location-free printing (hereinafter, referred to as LF printing) has been put into practice. In such LF printing, implemented is a system that uses a dedicated server to centrally manage multifunction peripherals (image forming apparatuses) and user information, so that users can output printouts from any device the user likes, after the user issues a printing instruction from a user personal computer (PC).

The LF printing is a function enabling a user to output a print from any one of a plurality of multifunction peripherals that are connected over a network, without the user designating which multifunction peripheral is to be used to output the print before the user issues the printing instruction from the PC. Even when the device often used by the user is not operating due to some trouble, or is congested, for example, the user can output a print from another available multifunction peripheral. This function of LF printing is known to serve to enable users to make effective use of time, for example.

For example, Japanese Unexamined Patent Application Publication No. 2009-294889 discloses a technique in which a user can output a print from any multifunction peripherals that are connected to a management server having an authentication function over a network, by transmitting the print data from the printer driver on the PC to the management server. This technique makes such printing possible by accumulating the print data transmitted from the user PC on the management server, and by causing a multifunction peripheral to fetch the accumulated data from the management server when the user is to actually output a print.

However, the technique disclosed in Japanese Unexamined Patent Application Publication No. 2009-294889 has a disadvantage that, when a user attempts to designate one of a plurality of multifunction peripherals supporting LF printing, the user is incapable of recognizing the availability of each of the multifunction peripherals accurately, and therefore, it is not possible for the user to select an available multifunction peripheral quickly, and to output a print efficiently.

In other words, while the conventional LF printing has the advantage that the user can output a print from any multifunction peripheral after the user issues a printing instruction from the PC, it is not possible for the user to recognize whether the multifunction peripheral often used by the user is currently in use, or has failed. For example, when there is a multifunction peripheral that supports LF printing on one floor of a building, the user is usually expected to use the multifunction peripheral. There are, however, some cases in which the user finds out that another user is outputting a large amount of prints, or the multifunction peripheral has failed when the user issues the printing instruction and thereafter arrives at the place where the multifunction peripheral is installed. In such a case, the user needs to go through a trouble of looking for another idle and available multifunction peripheral. As a result, the convenience for the user has been lost, and the operation has been inefficient, disadvantageously.

SUMMARY OF THE INVENTION

According to an aspect of the present invention, an information processing apparatus includes a history information acquiring unit, a statistics processing unit, a device information acquiring unit, and a display processing unit. The history information acquiring unit is configured to acquire history information on print outputs from a server. The statistics processing unit is configured to extract at least one image forming apparatus with a high usage ratio based on the acquired history information. The device information acquiring unit is configured to acquire device information related to an availability condition of the extracted at least one image forming apparatus directly from the at least one image forming apparatus. The display processing unit is configured to display information related to the acquired availability condition.

BRIEF DESCRIPTION OF THE DRAWINGS

FIG. 11 is a schematic view for explaining an exemplary GUI screen of the printer driver on the user PC.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
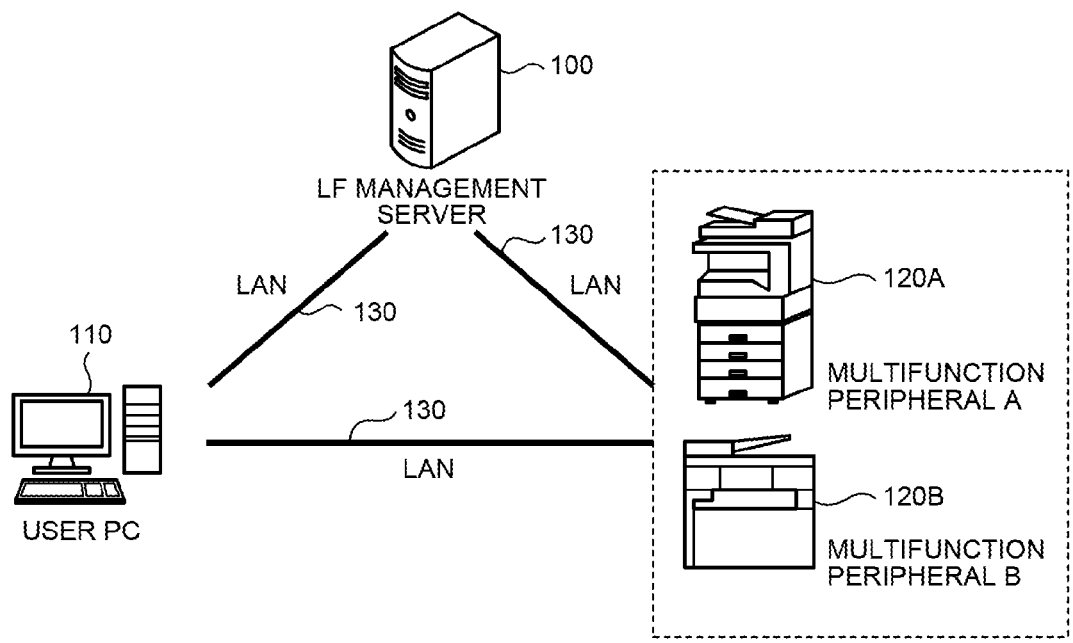
FIG. 1 is a schematic for explaining a system configuration according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An information processing apparatus, an information processing method, a recording medium, and an information processing system according to one embodiment of the present invention will now be explained in detail with reference to the appended drawings.

An embodiment has an object to provide an information processing apparatus, an information processing method, a recording medium, and an information processing system capable of notifying the availability of image forming apparatuses, and improving the efficiency of LF printing.

Embodiment

FIG. 1 is a schematic for explaining a system configuration according to the embodiment. As illustrated in FIG. 1, this system has a system configuration in which an LF management server 100, a user PC 110 that is an information processing apparatus, and multifunction peripherals 120A and 120B that are a plurality of printing output devices are connected over a network (LAN) 130, for example. Hereinafter, the user PC 110 will be simply referred to as a PC 110, and the multifunction peripherals 120A and 120B will be simply referred to multifunction peripherals 120, except for the part where there is concern for confusion. In FIG. 1, the multifunction peripherals 120 are illustrated to be two for the purpose of explanation, but the number of multifunction peripherals 120 is not limited to two. Furthermore, the PC 110 is also connected in plurality.

The LF management server 100 is a server for managing LF printing and having a user authentication function. The authentication function is a centrally managed authentication system that uses the authentication information used when the user logs into the own PC 110. Once the LF management server 100 confirms a match of the authentication information with the authentication information entered to the multifunction peripheral 120, the multifunction peripheral 120 is enabled to fetch a printing request issued by the user. The user can output a print from the multifunction peripheral 120 based on the printing request fetched by the multifunction peripheral 120. This function allows a user to output a print from any one of the multifunction peripherals 120.

The LF management server 100 has a function of managing the information on the multifunction peripherals 120 from which users actually output prints, as a history. The LF management server 100 identifies the multifunction peripheral 120 from which a print is output at the timing at which the user logs into the multifunction peripheral 120, and the printing request accumulated in the LF management server 100 is fetched. In this manner, the LF management server 100 can manage the multifunction peripheral 120 used by the user and the usage count.

A printer driver supporting LF printing is installed on the PC 110. The user transmits print data (in the page description language (PDL) format) to the LF management server 100 via the printer driver. The user logs into the PC, and issues a printing instruction to the printer driver from Microsoft Word, for example. The printer driver converts the print data into a data format (such as the PDL format) that can be interpreted by the multifunction peripheral 120, and transmits the print data to the LF management server 100.

The printer driver can acquire information on the devices previously used by the user from the LF management server 100. The device information is information for identifying a device such as an IP address or a MAC address, corresponding to each of the multifunction peripherals 120 previously used by the user. The printer driver can acquire such device information at a timing designated by the user.

For the communication between the multifunction peripheral 120 and the LF management server 100, used is a Web-based application programming interface (API) (Web application) using a general-purpose protocol such as Hypertext Transfer Protocol (HTTP). A data structure in a general-purpose format such as Extensible Markup Language (XML) is also used. The user can view a list of the devices previously used by the user via the screen (GUI) of the printer driver, and sort the data in an order of the usage count or the last usage time and date, for example.

When the user selects a particular multifunction peripheral 120 on the GUI, the printer driver acquires management information base (MIB) information in the multifunction peripheral over the network at the timing at which such a selection is made, and notifies the user of the condition of the multifunction peripheral 120. The MIB information is data that can be accessed by a network management protocol (Simple Network Management Protocol (SNMP)), and is defined in standard specifications represented by Request for Comments (RFC) 3805. The printer driver can acquire various types of condition information such as the status of the multifunction peripheral 120 by acquiring the MIB information in the multifunction peripheral 120 over the network 130.

The multifunction peripherals 120A, 120B are multifunction peripherals that are centrally managed by the LF management server 100, and the multifunction peripherals 120 can fetch a piece of user print data from the LF management server 100. A user transmits print data to the LF management server 100 from the own PC 110. In this process, the LF management server 100 accumulates the print data received from the user PC 110 in a manner linked to the user information. At the timing at which the user logs into a multifunction peripheral 120, the LF management server 100 acquires a list of accumulated print data using the user information (user ID) as a key. The multifunction peripheral 120 then displays the acquired list as a list of printable data on an operation panel (not illustrated), so that the user can output a print by selecting the required data from the list of printable data.

The multifunction peripherals 120 also support a network management protocol (SNMP) referred to as MIB, and the user can check the conditions of the multifunction peripherals 120 from the PC 110 using a dedicated application, for example. A possible common operation is to install the dedicated application on the management server, so that the management server can centrally manage each of the devices, but it is also possible to acquire the MIB information from a general-purpose PC over the network 130.

Figure 2:
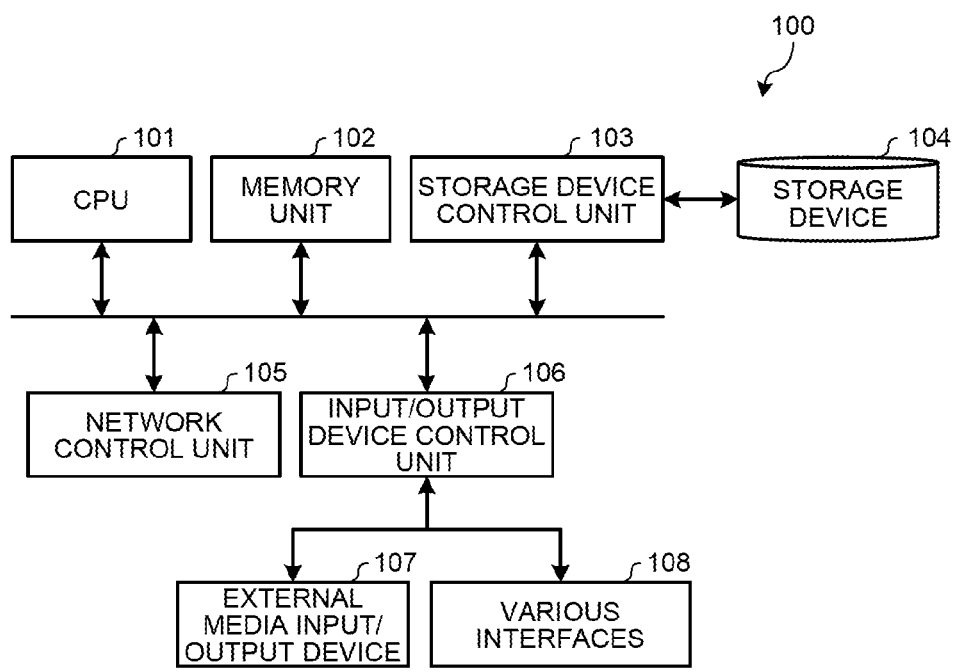
FIG. 2 is a block diagram illustrating a hardware configuration of an LF management server.

FIG. 2 is a block diagram illustrating a hardware configuration of the LF management server 100. In the LF management server 100, a central processing unit (CPU) 101, a memory unit 102, a storage device control unit 103, a network control unit 105, and an input/output device control unit 106 are connected via a bus. To the storage device control unit 103, a storage device 104 is connected. To the input/output device control unit 106, an external media input/output device 107 and various interfaces 108 are connected.

The CPU 101 controls various devices, and performs operations and processing on data. The CPU 101 is a processor executing a computer program stored in a main memory. The CPU 101 receives data from an input device or a storage device, performs operations and processing, and outputs the resultant data to an output device or a storage device.

Examples of the memory unit 102 include a read-only memory (ROM) and a random access memory (RAM). The memory unit 102 is a storage device for storing or temporarily retaining therein an operating system (OS), which is the basic software executed by the processor, computer programs such as application software, and data, for example.

The storage device control unit 103 performs control for connecting the storage device 104 such as a hard disk drive (HDD), and for storing data that is related to application software, for example. The storage device 104 stores therein various types of information (such as user information), and is managed through functions of a database or a file system, for example.

The network control unit 105 is an Ethernet (registered trademark) controller, for example, and has a function of communicating with other computers via a local area network (LAN) or a wide area network (WAN). The input/output device control unit 106 manages the external media input/output device 107 and the various interface devices 108, and inputs and outputs data from and to external devices.

The external media input/output device 107 controls external media such as a USB medium, a CompactFlash (registered trademark) (CF), and a secured digital (SD) card to input and output data. The various interfaces 108 are interfaces such as a serial port, a USB port, and an IEEE 1394 port for connecting external devices. General-purpose input/output devices can be used via these various interfaces.

Figure 3:
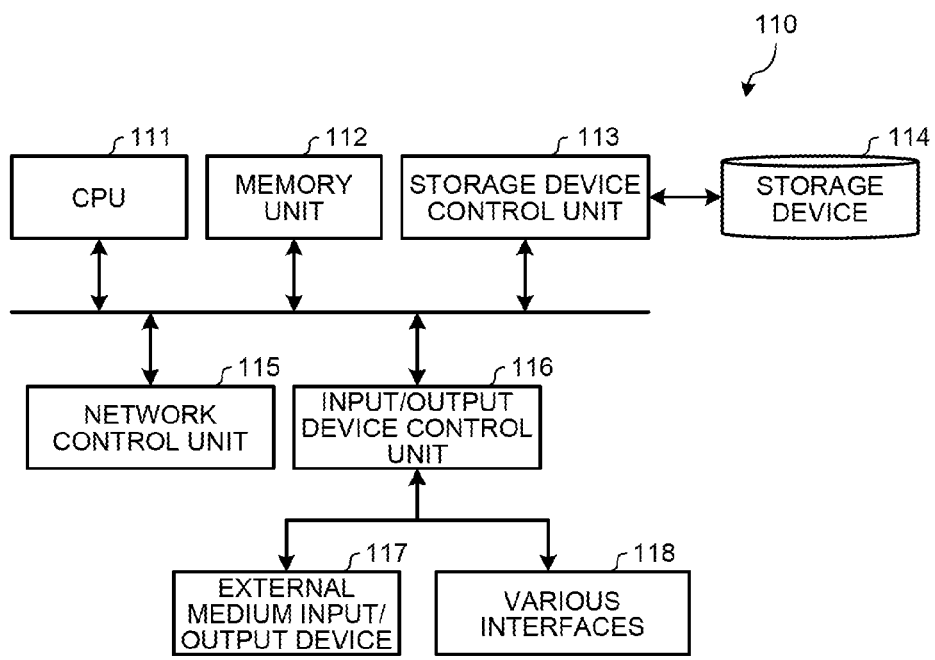
FIG. 3 is a block diagram illustrating a hardware configuration of a PC.

FIG. 3 is a block diagram illustrating a hardware configuration of the PC 110. In the PC 110, a CPU 111, a memory unit 112, a storage device control unit 113, a network control unit 115, and an input/output device control unit 116 are connected via a bus. To the storage device control unit 113, a storage device 114 is connected. To the input/output device control unit 116, an external medium input/output device 117 and various interfaces 118 are connected.

The CPU 111 controls various devices, and performs operations and processing on data. The CPU 111 is a processor executing a computer program stored in a main memory. The CPU 111 receives data from an input device or a storage device, performs operations and processing, and outputs the resultant data to an output device or a storage device.

Examples of the memory unit 112 include a ROM and a RAM. The memory unit 112 is a storage device for storing or temporarily retaining therein an OS, which is the basic software executed by the processor, computer programs such as application software, and data, for example.

The storage device control unit 113 performs control for connecting the storage device 114 such as a HDD, and for storing data related to application software, for example. The storage device 114 stores therein various types of information (such as user information), and is managed through functions of a database or a file system, for example.

The network control unit 115 is an Ethernet (registered trademark) controller, for example, and has a function of communicating with other computers over a LAN or a WAN. The input/output device control unit 116 manages the external medium input/output device 117 and the various interface devices 118, and inputs and outputs data from and to external devices.

The external medium input/output device 117 controls external media such as a USB medium, a CompactFlash (registered trademark) (CF), and an SD card, and inputs and outputs data. The various interfaces 118 are interfaces such as a serial port, a USB port, and an IEEE 1394 port for connecting external devices. General-purpose input/output devices can be used via the various interfaces.

Figure 4:
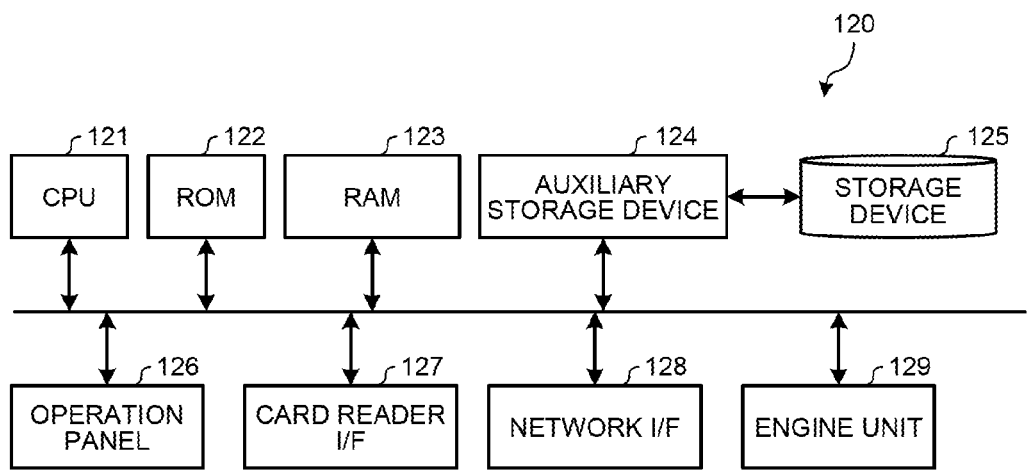
FIG. 4 is a block diagram illustrating a hardware configuration of a multifunction peripheral.

FIG. 4 is a block diagram illustrating a hardware configuration of the multifunction peripheral 120. In the multifunction peripheral 120, a CPU 121, a ROM 122, a RAM 123, an auxiliary storage device 124, an operation panel 126, a card reader interface (I/F) 127, a network I/F 128, and an engine unit 129 are connected via a bus. To the auxiliary storage device 124, a storage device 125 is further connected.

The CPU 121 executes various computer programs for controlling the multifunction peripheral 120. The ROM 122 and the RAM 123 are storage media temporarily storing therein computer programs and data during the operation of the multifunction peripheral 120. Such computer programs and data are loaded from the auxiliary storage device 124 at the time at which the multifunction peripheral 120 is started.

The auxiliary storage device 124 is a storage medium such as a HDD for storing therein computer programs and data. The auxiliary storage device 124 stores therein data generated by printing, scanning, and facsimile.

The operation panel 126 receives settings for a job, a request for executing a job, a request for executing a maintenance operation, and other requests via user operations. Examples of the operation panel 126 include a liquid crystal display and an organic electroluminescent (EL) display. The operation panel 126 also displays various screens such as an operation screen for performing settings, and messages to the user, for example.

The card reader I/F 127 is a device capable of reading user information from an integrated circuit (IC) card of a user contactlessly. The card reader I/F 127 is mainly used when a user logs into the multifunction peripheral 120. When a user does not use an IC card to log in, the user can log into the multifunction peripheral 120 by entering the user information via the operation panel 126, for example.

The network I/F 128 is an Ethernet (registered trademark) controller, for example, and communicates with other computers over a LAN or a WAN.

The engine unit 129 controls engines for a plotter and a scanner, for example, and executes a printing operation or a scanning operation.

Figure 5:
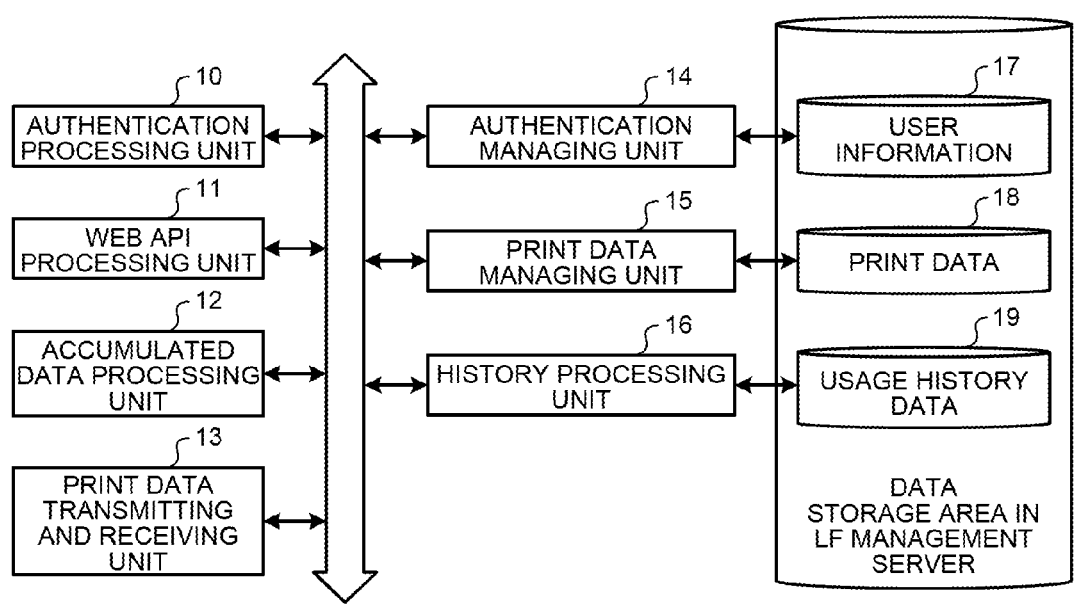
FIG. 5 is a block diagram illustrating a software functional configuration of the LF management server.

FIG. 5 is a block diagram illustrating a software functional configuration of the LF management server 100. The authentication processing unit 10 is a processing unit that governs user authentication such as log-in and log-out, and is used together with the authentication managing unit 14 managing the user information. In the LF environment, the authentication of the user logging into the own PC is mainly performed by an authentication server. The LF management server 100 also serves as this authentication server, and can manage the authentication via the user PC 110 and the authentication via the multifunction peripheral 120 (in a configuration in which a user enters a user ID or the like to log in) as the same session. Therefore, when a user issues a printing instruction from the own PC 110, the same print data can be shared with the multifunction peripheral 120 into which the same user logs.

The Web API processing unit 11 is a processing unit for communicating with the printer driver on the PC 110, and this communication is implemented using a general-purpose protocol such as HTTP(S). A general-purpose format such as XML is used as the data format, so that the data will not be platform-dependent.

The accumulated data processing unit 12 is a processing unit that is used when accumulation of data is requested by the printer driver on the PC 110.

The print data transmitting and receiving unit 13 is a processing unit that receives the print data generated by the printer driver on the PC 110, and transmits the print data to a multifunction peripheral 120 when there is a request from the multifunction peripheral 120.

The authentication managing unit 14 manages the user information such as user IDs for authenticating users, and is used together with the authentication processing unit 10.

The print data managing unit 15 is a managing unit that accumulates the print data generated by the printer driver on the PC 110, and stores the data mainly in a storage for data storage. Once the data is fetched by the print data transmitting and receiving unit 13, and a print is successfully output, such print data is deleted from the storage for data storage, so that storage area will be made available again.

The history processing unit 16 is a processing unit that makes the information on the multifunction peripheral 120 used in outputting a print by the user persistent, and manages such information as history information.

In the data storage area of the LF management server 100, user information 17, print data 18, and usage history data 19 are stored. Content of these pieces of data are described in Tables 1-1 and 1-2 below.

A part or the whole of the functional configurations of the LF management server 100 may be implemented as hardware.

Figure 6:
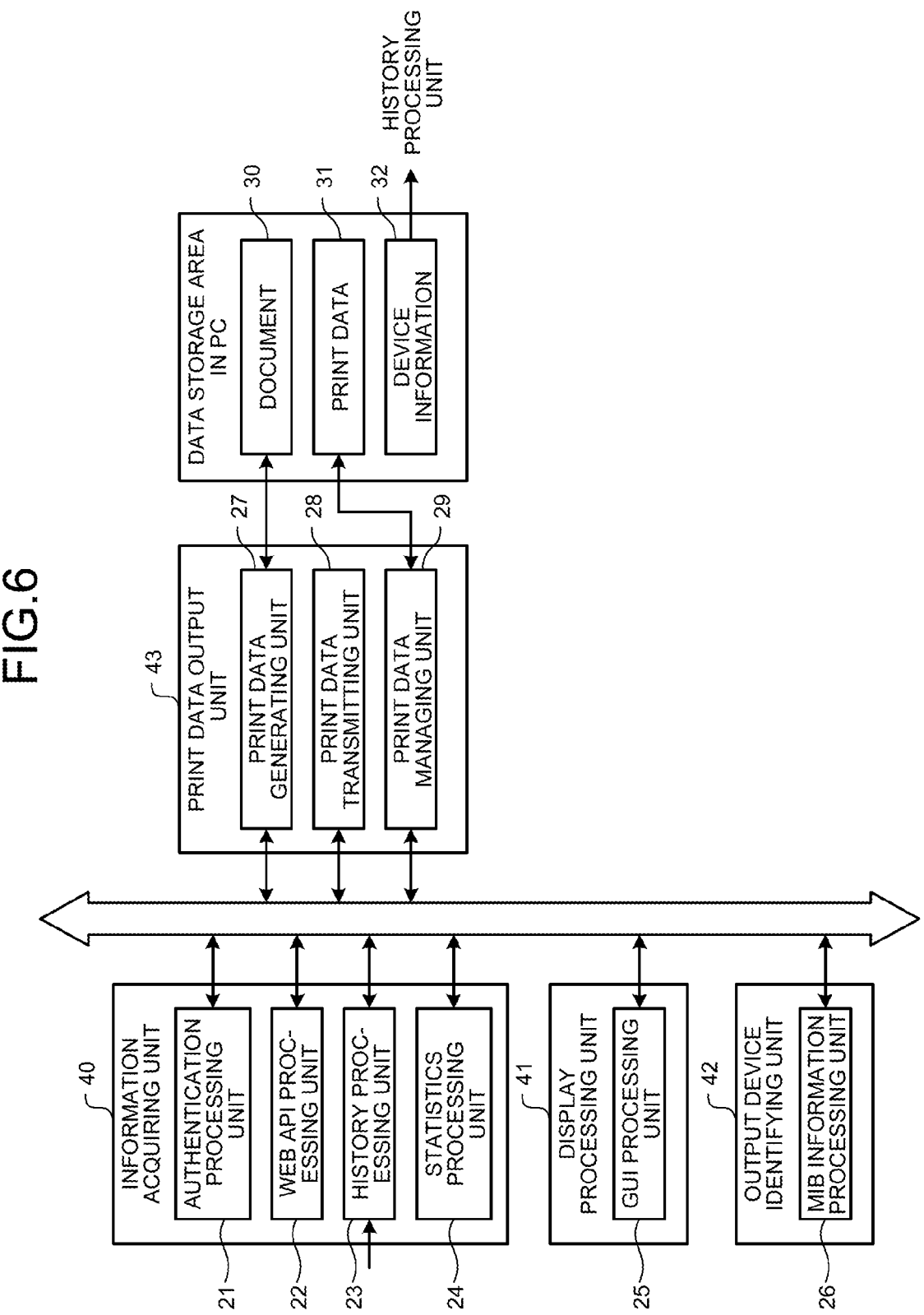
FIG. 6 is a block diagram illustrating a software functional configuration of a printer driver on the PC.

FIG. 6 is a block diagram illustrating a software functional configuration of the printer driver on the PC 110. An information acquiring unit 40 includes functions of an authentication processing unit 21, a Web API processing unit 22, a history processing unit 23, and a statistics processing unit 24. A display processing unit 41 includes a function of a GUI processing unit 25. An output device identifying unit 42 includes a function of an MIB processing unit 26. A print data output unit 43 includes functions of a print data generating unit 27, a print data transmitting and receiving unit 28, and a print data managing unit 29.

A part or the whole of the functional configurations of the printer driver on the PC 110 may be implemented as hardware.

A document 30, print data 31, and device information 32 are stored in the data storage area of the PC 110. Content of these pieces of data are described in Tables 2-1 to 2-4 below.

The authentication processing unit 21 is a processing unit that performs user authentication to the authentication processing unit 10 in the LF management server 100 based on the session information on the time at which the user logs into the PC 110. Therefore, the authentication processing unit 21 can handle the session at the time when the user logs into the multifunction peripheral 120 integrally. Thereby, an authentication system referred to as an integrated authentication system or single sign-on is constructed, and this system is realized with centrally managed user information and an authentication system and can handle a user as the same user as long as the user logs into the network using the same account information.

The Web API processing unit 22 is a processing unit that governs the communication with the LF management server 100, and is used in acquiring the usage history accumulated in the LF management server 100. The usage history of the entire users from the past to now is accumulated in the LF management server 100, and the Web API processing unit 22 can request the usage history via general-purpose protocols such as HTTP(S). The Web API processing unit 22 can be also considered as a history information acquiring unit, because the Web API processing unit 22 acquires the history information.

The history processing unit 23 processes the history information on the multifunction peripherals 120 previously used by the user and acquired from the LF management server 100. Acquired from the LF management server 100 is the history data from the time and date on which such data was acquired at one point in time in the past to now, so that there is no gap between the acquired pieces of history information. When the period over which such data is acquired is equal to or longer than, for example, one month, such data is divided in units of one month, for example, before such data is acquired, so that the network load is reduced.

The statistics processing unit 24 generates a list of the multifunction peripherals 120 previously used by the user from the past up to now, based on the history data acquired by the history processing unit 23, and calculates the multifunction peripheral 120 having been used most recently and having the highest usage count. The last usage time as well as the usage count is considered because there is a possibility for the multifunction peripherals 120 to be replaced regularly. In this manner, a list of multifunction peripherals 120 that are frequently used by the user can be calculated.

The GUI processing unit 25 processes a graphical user interface (GUI) screen of the printer driver. The GUI screen can operate interactively with a user, and also accepts requests from the user. The GUI processing unit 25 can specify setting such as printing settings for the printer, and conditions for the finisher (sheet post-processing apparatus) performing binding, punching, sorting, and the like. The GUI processing unit 25 can also display a list of multifunction peripherals 120 previously used by the user, and detailed information on a multifunction peripheral 120 selected by the user. The list of multifunction peripherals 120 previously used by the user is acquired by communicating with the LF management server 100, and the printer driver acquires the information on a specific multifunction peripheral 120 based on the acquired information. The information on the multifunction peripheral 120 corresponds to the MIB information, and is acquired by the MIB information processing unit 26.

The MIB information processing unit 26 acquires the MIB information from a multifunction peripheral 120 selected by a user, over the network 130. The information on the multifunctional peripheral selected by the user includes the IP address identifying the multifunction peripheral, so that the MIB information processing unit 26 accesses the multifunction peripheral 120 based on the IP address, and acquires the MIB information. Once the MIB information is acquired, the MIB information is displayed in the GUI screen in a format that can be easily understood by users, e.g., as a table, so that the user can determine whether the multifunction peripheral 120 is available or has failed, for example, by looking at the information. The MIB information processing unit 26 may also be considered as a device information acquiring unit because the MIB information processing unit 26 acquires the availability information (that is, MIB information or device information) indicating whether each of a plurality of multifunction peripherals (image forming apparatuses) or each of the functions included in the multifunction peripherals is available.

The print data generating unit 27 generates print data of a document designated by the user. Examples of the document include a text file, a file created on MS Word (registered trademark), and an image file. The print data is data in the PDL format that can be interpreted by the multifunction peripheral (printer) 120, and the data associated thereto. The generated print data is transmitted to the LF management server 100. While the data is being created, or immediately before the data is transmitted over the network 130, the print data is stored temporarily in a storage area.

The print data transmitting unit 28 is a processing unit that transmits the print data generated by the printer driver to the LF management server 100.

The print data managing unit 29 manages the print data created by the print data generating unit 27. The print data generating unit 27 generates a piece of print data for each document or each page of a document, and therefore, the print data managing unit 29 manages a set of pieces of print data when a user requests printing of a plurality of documents.

In FIG. 6, the information acquiring unit 40 acquires the device information including information related to the availability condition of the multifunction peripherals 120 that are a plurality of image forming apparatuses, via the LF management server 100. The display processing unit 41 displays the availability conditions of the image forming apparatuses on the display unit based on the acquired device information. The output device identifying unit 42 receives a selection of the image forming apparatus to be used by the user via the display unit. The image forming apparatus from which the print is to be output is then identified. The print data output unit 43 outputs the print data to the selected image forming apparatus.

The device information provides device identification information such as the IP address of a multifunction peripheral 120 that is frequently used by the user, and the current condition of the device, and these pieces of information are enabled to be displayed on a screen (GUI) of the printer driver. The determination as to whether a device is frequently used by the user is calculated based on the usage count and the last usage time, among the history information accumulated in the LF management server 100. In this manner, the user can recognize the current condition of the multifunction peripheral 120 frequently used by the user, and the conditions of the other multifunction peripherals 120.

In this manner, the information acquiring unit 40 acquires the device information including the availability-related information and the history information on a plurality of image forming apparatuses (the multifunction peripherals 120) from the LF management server 100 over the network 130. The display processing unit 41 causes the user to refer to the acquired device information to select an image forming apparatus (multifunction peripheral 120) from which a print is to be output. The print data output unit 43 then outputs the print data to the image forming apparatus (the multifunction peripheral 120).

Therefore, the printer driver on the PC 110 to which the user gives a printing instruction, communicates with the LF management server 100 to acquire the information described below, and notify the user of the information. In other words, the PC 110 acquires the IP addresses, the printing conditions, and the like for the past print output information for the user (image forming apparatus (the multifunction peripheral 120)). Using such data, the PC 110 acquires the device information directly from the image forming apparatus designated by the user before the user actually outputs a print. Furthermore, the PC 110 can notify the user of the conditions of that image forming apparatus (such as another user currently printing) in advance.

The information acquiring unit 40 also acquires, when a notification of the device information is received from the LF management server 100 or when a specific image forming apparatus is selected by the user via the display unit, the device information on the selected image forming apparatus. The display processing unit 41 displays the device information on the display unit.

In this manner, at the timing at which the notification of the device list is received from the LF management server 100 and at the timing at which the user selects a particular multifunction peripheral 120 from the GUI of the printer driver, the printer driver acquires the MIB information from the multifunction peripheral 120, and notifies the user of the information via the GUI. Thereby, the user can be notified of the list of the multifunction peripherals 120 having been used in the past, and the current information on the most frequently used multifunction peripheral 120 when the user displays the GUI screen of the printer driver.

The information acquiring unit 40 merges history information received from the LF management server 100 with the history information having already been accumulated while avoiding duplication. The information acquiring unit 40 includes the history processing unit 23 that acquires, when the time period from when the history information was acquired last time and to now is equal to or longer than a predetermined time period, the history information from the LF management server 100 in a manner divided in units of the predetermined period.

In other words, when the history processing unit 23 receives the user history information from the LF management server 100 via the information acquiring unit 40, the history processing unit 23 merges (integrates) the received history information with the history information having already been accumulated by the printer driver, and removes the redundancy so as to prevent the same history from being accumulated redundantly. When the period from when the history information was acquired last time to now is equal to or longer than one month, for example, the history information divided in units of one month, for example, is acquired from the LF management server. Because the user history information accumulated in the printer driver is not always available for acquisition, there might be a long time interval since the history information was acquired last time. The history processing unit 23 can acquire the long-term history by dividing the history in some units, and remove the redundancy before accumulating the history in the printer driver even when the history having already acquired is acquired again.

The information acquiring unit 40 also includes the statistics processing unit 24 that extracts one or more image forming apparatuses having been used from the past to now based on the history information processed by the history processing unit 23, and extracts only the device information on the reachable image forming apparatuses, among the image forming apparatuses extracted. In this manner, the statistics processing unit 24 can not only perform statistical processing based on the history information, but also extract only the devices that are currently reachable (available), among the extracted multifunction peripherals 120 included in the list.

Figure 7:
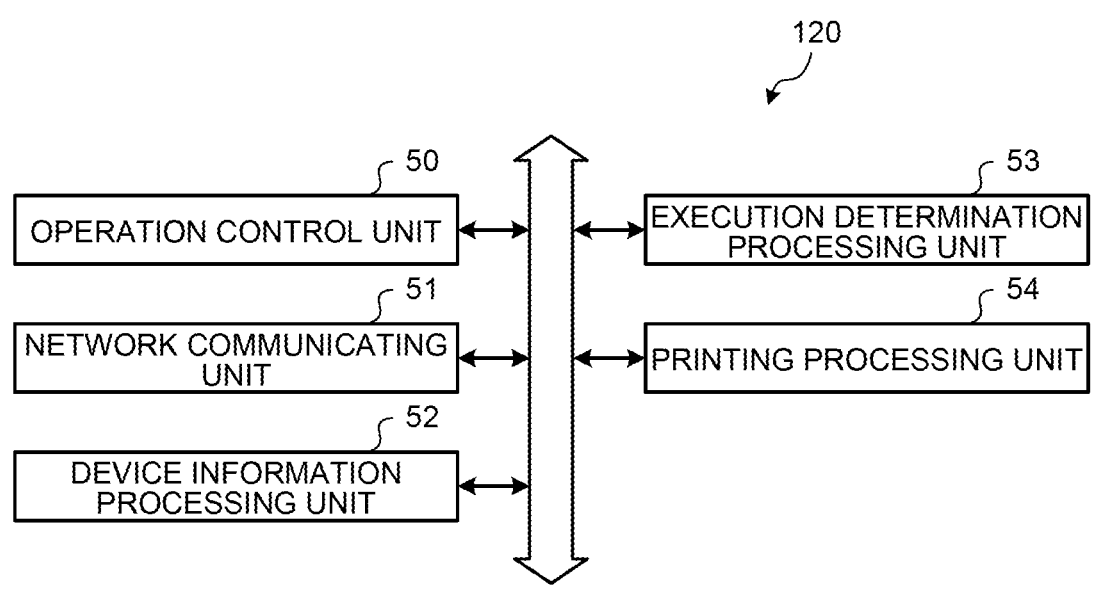
FIG. 7 is a block diagram illustrating a software functional configuration of the multifunction peripheral.

FIG. 7 is a block diagram illustrating a software functional configuration of the multifunction peripheral 120. An operation control unit 50 is a GUI that displays an operation screen for allowing the user to make operations on the operation panel 126, and receives inputs from the user. The operation control unit 50 also receives a request for causing the multifunction peripheral 120 to execute a job via a user operation.

A network communicating unit 51 communicates with external computers over the network 130, and communicates with the user PC 110 and the LF management server 100. The network communicating unit 51 also receives a request to acquire MIB information from the user PC 110 or the LF management server 100 over the network management protocol (SNMP). Once the request to acquire the MIB information is received, the network communicating unit 51 returns the information collected by the device information processing unit 52 to the requestor.

A device information processing unit 52 is a processing unit that regularly keeps a tally and accumulates various types of information related to the multifunction peripheral 120. As the various types of information, the device information processing unit 52 manages the conditions of sheets or toner in the multifunction peripheral 120, an online or offline status of the device, a status such as a transition to or resume from energy-saving, and a comprehensive condition representative of the multifunction peripheral 120 based on comprehensive determination of these conditions. The device information processing unit 52 makes a diagnosis on such conditions regularly (e.g., one minute or so), and manages these conditions as the conditions of the multifunction peripheral 120. The device information processing unit 52 also sometimes acquires these conditions in response to a request from an external computer, for example.

An execution determination processing unit 53 determines whether a job requested via the operation control unit 50 or over the network 130 can be executed, considering the conditions of consumable printing supplies, e.g., the remaining number of sheet and the toner conditions.

A printing processing unit 54 is a processing unit that executes printing in response to a job requested via the operation control unit 50 or over the network 130. For example, in a job requested via the operation panel 126, the printing processing unit 54 causes the scanner to read a document to acquire print data or selects print data accumulated in advance to output a print.

The information related to the LF management server 100, the PC 110, the multifunction peripheral 120 will now be explained. Table 1-1 is a table representing the history of usage by each of the entire users and the device information managed by the LF management server 100. Table 1-1 accumulates information such as the time and date at which each user has output a print from which multifunction peripheral 120, to clarify which user has used which one of the devices at what point in time. Table 1-1 is updated when a user issues a printing request from the own PC 110, and a request for accumulating print data from the LF management server 100 is generated. This table is also updated at the timing at which a user outputs a print from a particular multifunction peripheral 120.

TABLE 1-1

| | Time and date of usage | User name | Output device |
|---|---|---|---|
| 1 | 2015/04/03 01:23:45+0900 | user 1 | deviceID_0123 |
| 2 | 2015/04/02 23:45:12+0900 | user 2 | deviceID_0234 |
| 3 | 2015/04/01 12:23:34+0900 | user 1 | deviceID_0123 |
| 4 | 2015/03/30 03:56:22+0900 | user 3 | deviceID_0345 |
| 5 | 2015/03/29 20:44:47+0900 | user 1 | deviceID_0123 |

Table 1-2 is a table indicating the current conditions of the multifunction peripherals 120. This table manages the reachability information on the devices having been used by users. This table is updated at the timing at which a print is output from a user PC 110, as described earlier, and at predetermined timing, e.g., at a regular interval (e.g., one o'clock every night). The reachability status mainly takes one of two values of either reachable or unreachable, and only the information on reachable devices is notified when the acquisition of the history is requested by the printer driver. In this manner, packets sent across the network 130 can be reduced, so that the load in the network 130 can be suppressed.

The data stored in the table illustrated in Table 1-2 mainly includes the connection status with a multifunction peripheral 120, the time and date at which the information is updated, and the IP address identifying the multifunction peripheral. When such a device becomes unreachable due to causes such as a change in the IP address, the data corresponding to the device is overwritten with new data to avoid redundancy. When an unreachable status persists, the time and date of the update is kept unupdated.

The LF management server 100 extracts the usage history of a specific user and of the multifunction peripherals 120 that are reachable (currently in connection) from the entries in Tables 1-1 and 1-2, and notifies the user's printer driver of the extraction.

TABLE 1-2

| | Multifunctional peripheral | Information update time and date | Reachability status | IP address |
|---|---|---|---|---|
| 1 | deviceID_0123 | 2015/06/01 01:00:00+0900 | Connecting | 192.168.10.110 |
| 2 | deviceID_0234 | 2015/06/01 01:00:00+0900 | Connecting | 192.168.10.150 |
| 3 | deviceID_0345 | 2014/12/30 01:00:00+0900 | Unreachable | 192.168.10.115 |
| 4 | deviceID_0456 | 2015/06/01 01:00:00+0900 | Connecting | 192.168.10.120 |
| 5 | deviceID_0567 | 2014/10/20 01:00:00+0900 | Unreachable | 192.168.10.135 |

Table 2-1 is a table representing the user usage history acquired from the LF management server 100 by the printer driver on the user PC 110. Table 2-1 illustrates an example of the usage history and the device information acquired from the LF management server 100 for the user 1. This information is the history information on the user outputting prints from the multifunction peripherals 120. The printer driver on the user PC 110 receives the history information for a period from when the history information was acquired last time to now. When there is an interval equal to or longer than one month between the time and date on which the history information was acquired last time to now, the history information is divided into units of data corresponding to one month or so, and is transmitted multiple times, because the amount of data to be transmitted and received may be large.

This history is acquired as a list of the names and the IP addresses of the multifunction peripherals 120 used by the user, and the time and date of the usage, from the LF management server 100, and is stored persistently in a storage area of the user PC 110, for example, in such a manner that there is no redundancy with the data having been acquired in the past.

TABLE 2-1

| | Time and date of usage | User name | Output device |
|---|---|---|---|
| 1 | 2015/04/03 01:23:45+0900 | user 1 | deviceID_0123 |
| 2 | 2015/04/01 12:23:34+0900 | user 1 | deviceID_0123 |
| 3 | 2015/03/29 20:44:47+0900 | user 1 | deviceID_0123 |
| | . . . | user 1 | . . . |

Table 2-2 is a table presenting the result of statistics calculated from the history data persistently stored in the user PC 110. Table 2-2 presents exemplary usage history and device information on the user 1. This table presents a tally of the usage count of each one of the specific devices based on the usage history from when the history data was started to being persistently stored to now. If a device has a high usage count and the time and the date of the last usage is recent, the device can be recognized as a device frequently used by the user.

TABLE 2-2

| | Output device | Time and date of last usage | Usage count |
|---|---|---|---|
| 1 | deviceID_0123 | 2015/04/03 01:23:45+0900 | 234 |
| 2 | deviceID_0234 | 2015/02/13 08:45:12+0900 | 50 |
| 3 | deviceID_0345 | 2014/12/20 12:23:34+0900 | 423 |
| 4 | deviceID_0456 | 2015/11/09 03:56:22+0900 | 102 |
| 5 | deviceID_0567 | 2014/08/11 20:44:47+0900 | 23 |

Table 2-3 is a table resulting from sorting the data tallied in Table 2-2 in the descending order of the usage ratio. Table 2-3 represents a list of multifunction peripherals 120 with high usage ratios by the user 1. With this information, it can be determined that the user uses the multifunction peripherals 120 more frequently in the descending order, from the top of Table 2-3. In this process, because there is a possibility for a multifunction peripheral 120 not to be able to establish a connection with the network due a different IP address from the previous one, for example, a simple reachability test using a packet internet groper (ping) command, for example, is performed before this table is updated. The information on any unreachable device (multifunction peripherals 120) is excluded. This exclusion process is a process of when performed to ensure that the same device is registered with a plurality of IP addresses, or a plurality of devices is registered with the same IP address.

TABLE 2-3

| | Output device | Time and date of last usage | Usage count | IP address |
|---|---|---|---|---|
| 1 | deviceID_0123 | 2015/04/03 01:23:45+0900 | 234 | 192.168.10.110 |
| 2 | deviceID_0234 | 2015/02/13 08:45:12+0900 | 50 | 192.168.10.150 |
| 3 | deviceID_0456 | 2014/11/09 03:56:22+0900 | 102 | 192.168.10.135 |

Table 2-4 is a table presenting the MIB information acquired from a specific device (multifunction peripheral 120). Table 2-4 presents the current condition of a specific device ID_0123. In other words, this table presents the current conditions of the multifunction peripheral 120 (e.g., available, now printing, failed, short of sheet, and nearly short of toner), and the user can recognize which multifunction peripheral 120 is idle based on this information. This table is updated by acquiring the MIB information from the multifunction peripheral 120 at the timing at which a user selects that particular multifunction peripheral from the usage history in the GUI screen of the printer driver. This table is updated at a preset interval (e.g., one minute subsequent to a startup, and subsequently in the increment of one minute), sequentially in the descending order, from the top to the bottom of the list having been extracted via the statistical processing.

TABLE 2-4

| | Item | Condition |
|---|---|---|
| 1 | Device condition | Normal |
| 2 | Detailed device condition | Idle |
| 3 | Printer condition | Available |
| 4 | Current error condition | None |
| 5 | Sheet condition | Normal |
| 6 | Tray 1 (A4) | Normal |
| 7 | Tray 2 (A3) | Normal |
| 8 | Toner condition | Normal |
| 9 | Toner (B) | 57% |
| 10 | Toner (C) | 80% |
| 11 | Toner (Y) | 92% |
| 12 | Toner (M) | 75% |
| | . . . | . . . |

Tables 3-1 to 3-7 are tables presenting representative MIB information retained by the multifunction peripheral 120. Table 3-1 indicates the comprehensive condition of the device acquired as the MIB information. Table 3-2 indicates the error condition of the multifunction peripheral 120. Table 3-3 indicates the device availability condition of the multifunction peripheral 120. Table 3-4 indicates the condition as to whether any non-critical alert for the multifunction peripheral 120 is present. Table 3-5 indicates the condition as to whether a critical alert for the multifunction peripheral 120 is present. Table 3-6 indicates the on-line/off-line condition of the multifunction peripheral 120. Table 3-7 indicates the transition condition of the multifunction peripheral 120.

The multifunction peripheral 120 has an MIB function enabling the current conditions to be acquired over the network 130, and this MIB function can be accessed via the network management protocol (SNMP). With the MIB information referred to as Printer MIB v2, in particular, the information specific to the multifunction peripheral can be acquired in a database format.

By acquiring this data, the printer driver on the user PC 110 can determine the current conditions of the multifunction peripheral 120.

TABLE 3-1

| | Comprehensive printer condition | Device condition | Printer condition |
|---|---|---|---|
| 1 | Idle | Normal | Available |
| 2 | Currently in use/active | Normal | Printing |
| 3 | Non-critical alert | Alert | Idle or printing |
| 4 | Critical alert | Unusable | Unknown |
| 5 | Unavailable | Unusable | Unknown |
| 6 | Transiting to off-line | Alert | Idle or printing |
| 7 | Off-line | Unusable | Others |
| 8 | Transiting to on-line | Unusable | Warming up |
| 9 | Stand-by | Normal | Others |

TABLE 3-2

| | Error condition |
|---|---|
| 1 | Nearly short of sheet |
| 2 | Short of sheet |
| 3 | Nearly short of toner |
| 4 | Short of toner |
| 5 | Door open |
| 6 | Paper jam |
| 7 | Off-lined |
| 8 | Request for service |
| 9 | No sheet-feeding tray |
| 10 | No sheet-discharge tray |
| 11 | Short of drawing consumable |
| 12 | Sheet-discharge bin nearly full |
| 13 | Sheet-discharge bin full |
| 14 | Sheet-feeding tray empty |
| 15 | Maintenance for expiration prevention |

TABLE 3-3

| | Availability status |
|---|---|
| 1 | Available and idle |
| 2 | Available and standby |
| 3 | Available and active |
| 4 | Available and currently in use |
| 5 | Available and receiving request |
| 6 | Unavailable due to failure |
| 7 | Unknown |

TABLE 3-4

| | Non-critical alert |
|---|---|
| 1 | Non-critical alert off |
| 2 | Non-critical alert on |

TABLE 3-5

| | Critical alert |
|---|---|
| 1 | Critical alert off |
| 2 | Critical alert on |

TABLE 3-6

| | On-line |
|---|---|
| 1 | On-line |
| 2 | Off-line |

TABLE 3-7

| | Transition |
|---|---|
| 1 | Currently in mode |
| 2 | Currently transiting to mode |

Figure 8:
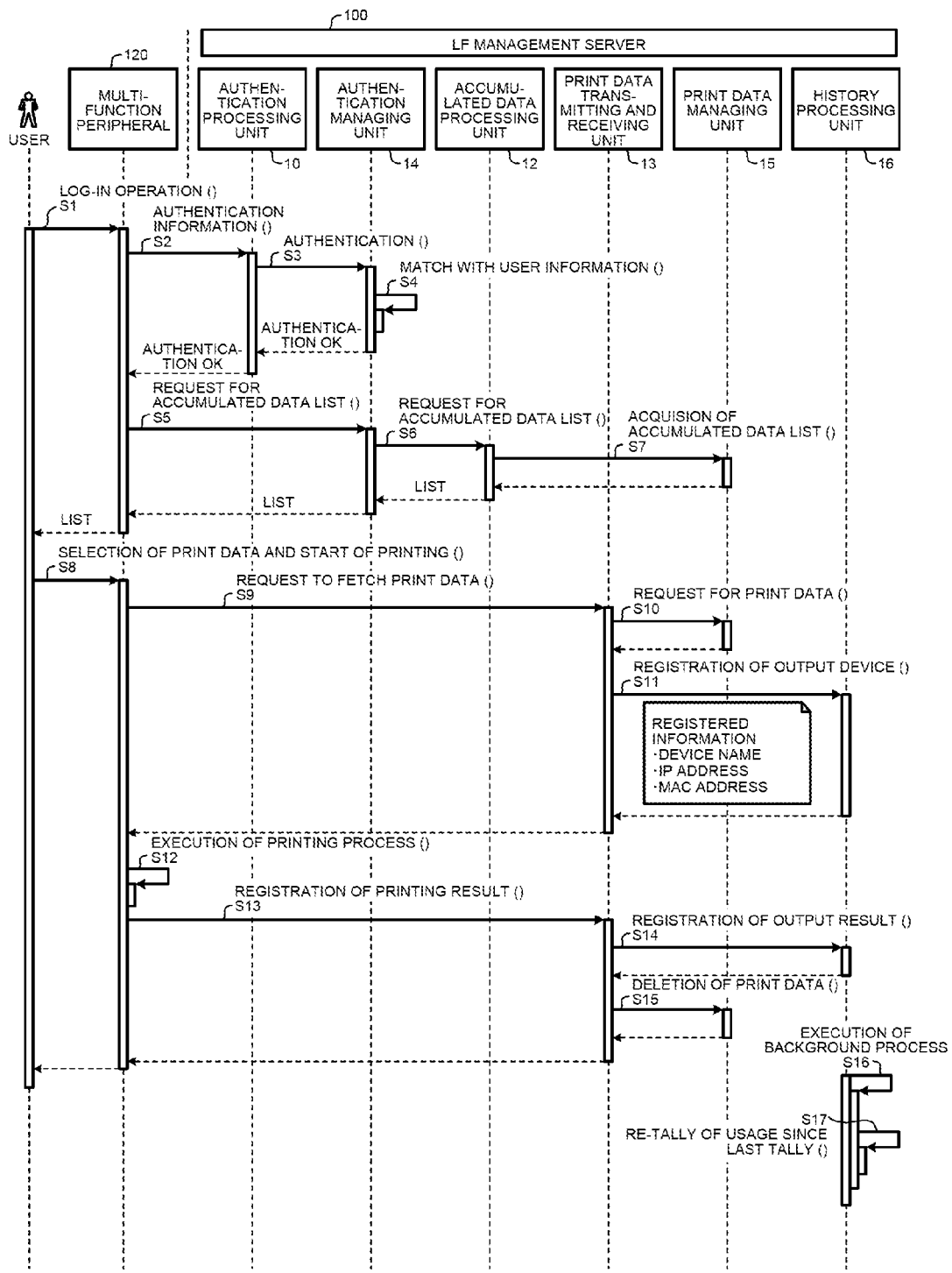
FIG. 8 is a sequence chart illustrating the sequence of a process of accumulating history information in the LF management server when the user outputs a print from the multifunction peripheral.

A process of outputting a print, a process of requesting printing, and a process of acquiring device information will now be explained. FIG. 8 is a sequence chart illustrating the sequence of a process in which the LF management server 100 accumulates the history information at the timing at which the user outputs a print from a multifunction peripheral 120.

In FIG. 8, to begin with, a user operates the operation panel 126 on the multifunction peripheral 120 to log into the multifunction peripheral 120 (Step S1). To log in, the user uses the ID having been set in advance on the operation panel 126, or the IC card embedded with information for identifying the user. When the log-in is executed, the multifunction peripheral 120 generates an inquiry addressed to the LF management server 100 serving as an authentication server (Step S2). The user information is centrally managed on the LF management server 100. An inquiry addressed to the authentication server (the LF management server 100) is also generated when the user logs into the PC 110, in the same manner as when the user logs into the multifunction peripheral 120 (Step S3).

Upon receiving the log-in request from a client (the multifunction peripheral 120 or the PC 110), the LF management server 100 causes the processing unit governing the authentication function to authenticate, and matches the received user information with the centrally managed user information. If the match succeeds, a log-in state is achieved (Step S4).

When the user transits to the log-in state, the user can now acquire a list of print data accumulated in the LF management server 100 (Steps S5 to S7). This list will present the user with the print data having been received from the user PC 110 in advance but not having been printed yet. Upon receiving the list of the accumulated data corresponding to the user having logged into the multifunction peripheral 120, the multifunction peripheral 120 displays the list as a list of printable data on the operation panel 126. The user is allowed to delete some data from the list, because the user may no longer need to print the data in some cases.

Once the user selects some data to be printed on the operation panel 126 of the multifunction peripheral 120 and starts printing, the multifunction peripheral 120 is permitted to acquire the print data on the list from the LF management server 100, one piece at a time, and starts executing printing (Steps S8 to S10). When the multifunction peripheral 120 fetches a piece of the print data, the LF management server 100 registers therein the multifunction peripheral 120 as a device from which the user outputs a print, as history (Step S11). Registered at this time when the print is output as the information on the multifunction peripheral 120 are the IP address and the device name (e.g., host name) identifying the device, for example.

Upon completion of the printing from the multifunction peripheral 120 (Step S12), the multifunction peripheral 120 notifies the LF management server 100 of the printing result (Step S13).

Upon completion of registering the printing result (Step S14), the LF management server 100 deletes the print data (Step S15), and performs a background process of updating the device usage history that is registered for each user (Steps S16 to S17). The process includes updating of the usage history, and taking a tally of the usage count again. This updating process is executed every time the user outputs a print.

Figure 9:
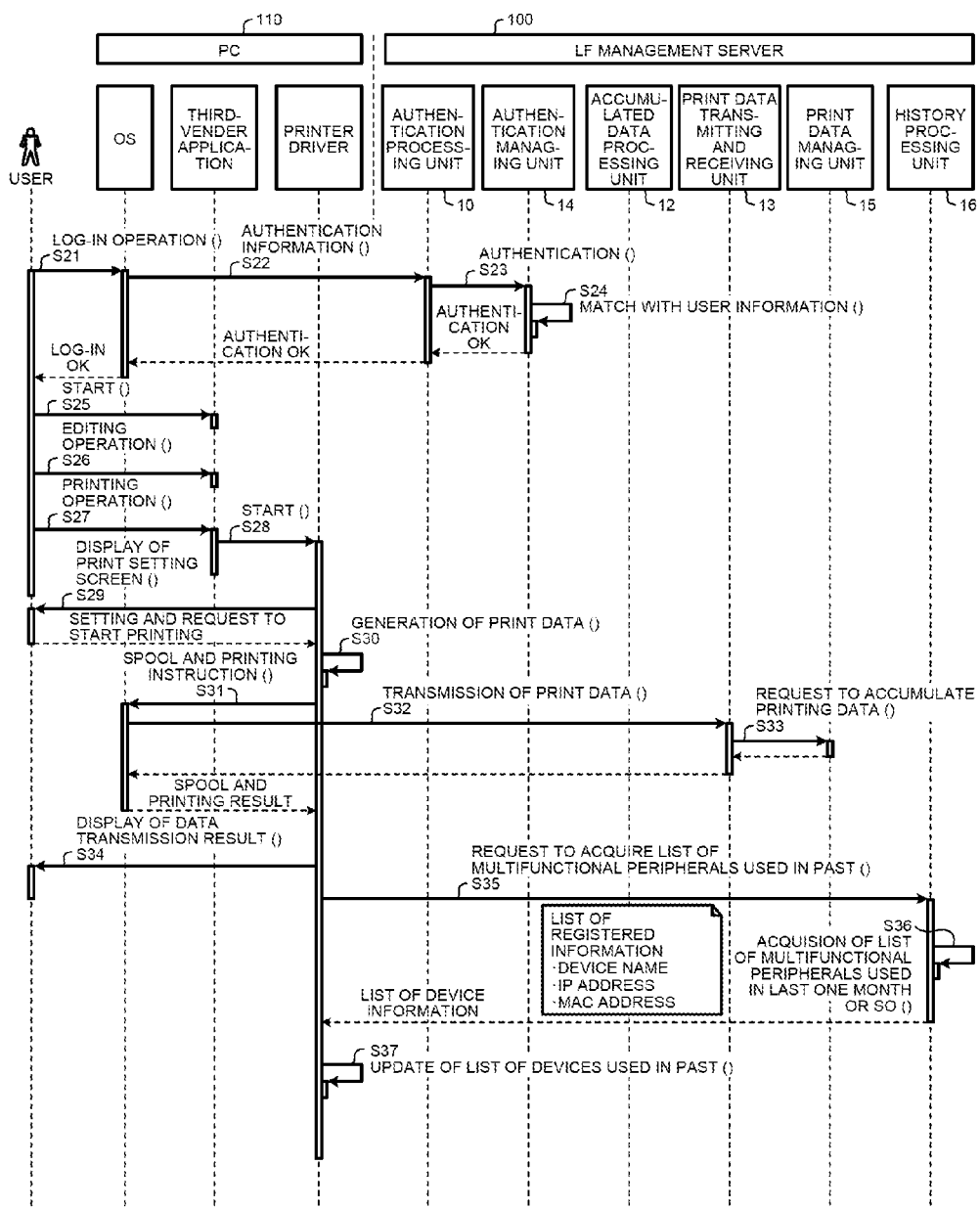
FIG. 9 is a sequence chart illustrating a process in which a user issues a printing request from a PC (printer driver)

FIG. 9 is a sequence chart illustrating the sequence of a process in which the user requests printing from the PC 110 (printer driver). In FIG. 9, the user turns ON the power of the own PC 110, and logs into the PC 110 (Step S21). In the log-in process, the OS generates an inquiry addressed to the authentication server (the LF management server 100), and the authentication server matches the user information with the centrally managed user information (Steps S22 to S24). If matching of the authentication information is successful, the user can log into the PC 110. If the authentication fails, the log-in to the PC 110 is disabled.

The user then executes printing of a document on an application running on the PC (Steps S25 to S27). Examples of the application include document editing software such as Microsoft Word, and image editing software. The application then starts the printer driver (Step S28), and causes the printer driver to display a print preview screen, various print settings, and so on (Step S29).

The printer driver presents the user with various settings on the GUI screen. Once the user executes start printing, the printer driver generates the print data in a format that can be interpreted by the multifunction peripheral (Step S30).

Once the print data is generated, the printer driver spools the print data using an API of the OS, and prepares the print data for the transmission to the LF management server 100 (Step S31). Once the print data is transmitted to the LF management server 100 (Step S32), the LF management server 100 manages the print data, as the accumulated data, in a manner linked to the user (Step S33). Once the spooling and transmission of the print data to the LF management server 100 are completed without any problem, a message indicating a successful completion is displayed in the GUI of the printer driver (Step S34).

The printer driver then accesses the LF management server 100 on the background, and acquires the history of usage by the user in the past (Steps S35 to S36). The printer driver transmits the request to acquire such history, as well as the information on the user, the period for which the history is to be acquired, and the like, to the LF management server 100, and receives the response from the LF management server 100. The information that can be acquired is the history information accumulated in the LF management server 100, and includes information such as the device names, the IP addresses, the MAC addresses, and the like of the multifunction peripherals 120 from which the user has output prints in the past. Once these pieces of information are acquired, the information is added to the history information accumulated in the printer driver (Step S37).

Figure 10A:
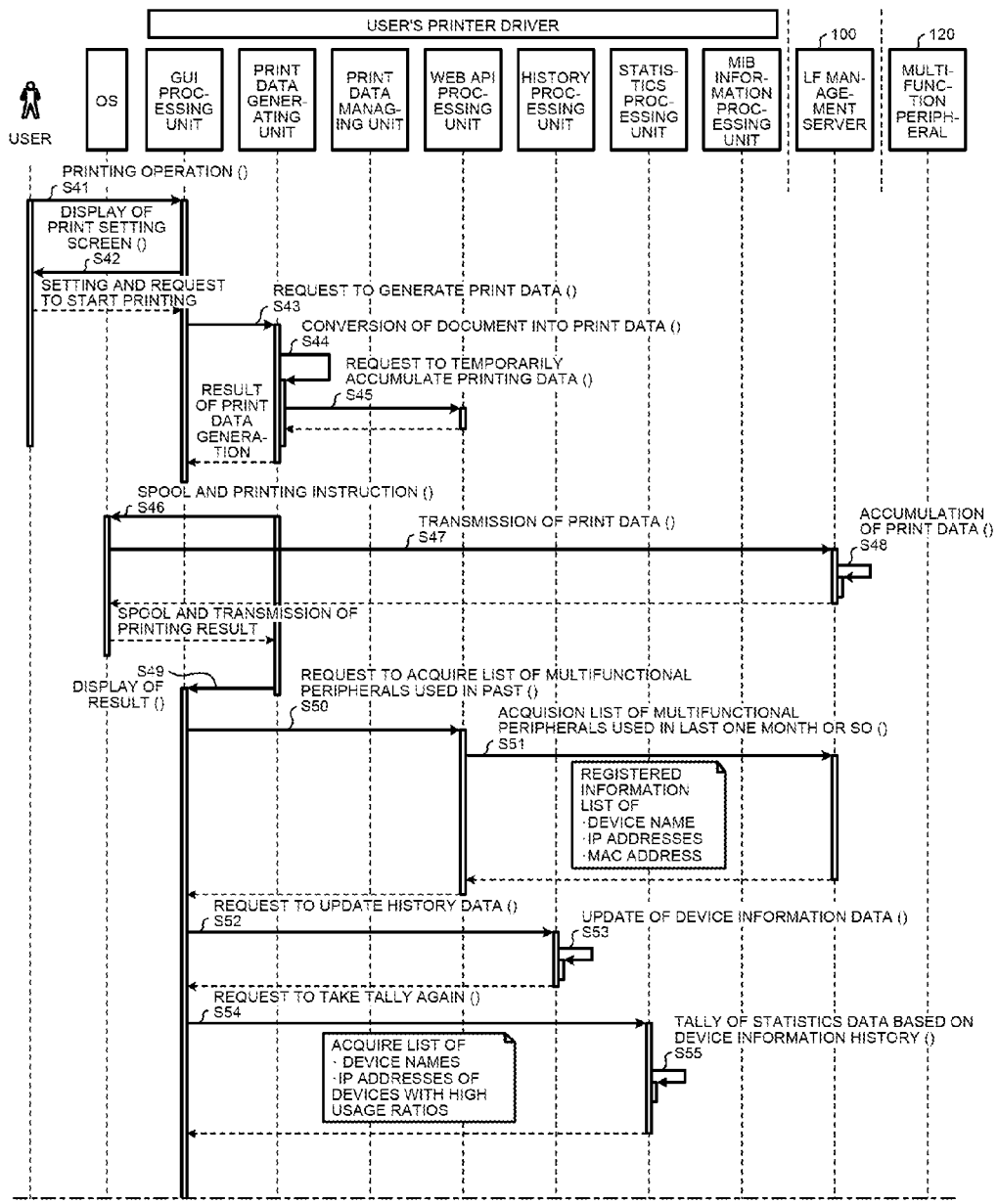
FIG. 10A is a sequence chart illustrating an internal process of the printer driver in the sequence illustrated in FIG. 9.
Figure 10B:
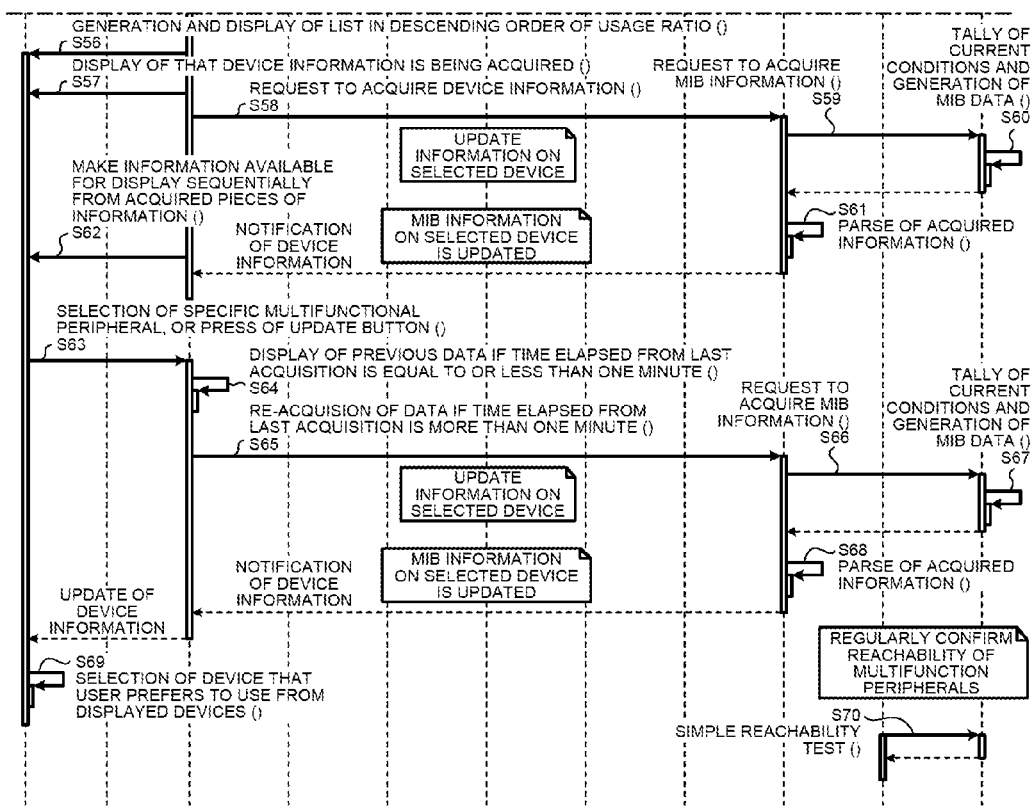
FIG. 10B is another sequence chart illustrating an internal process of the printer driver in the sequence illustrated in FIG. 9.

FIGS. 10A and 10B are sequence charts illustrating an internal process of the driver in the sequence illustrated in FIG. 9. The process before the usage history of the multifunction peripheral 120 is acquired, as illustrated as S41 to S52 in FIG. 10A, is substantially the same as Steps S21 to S32 in FIG. 9.

Once the usage history of the multifunction peripherals 120 is acquired from the LF management server 100, the printer driver updates the data internally retained. Before updating the data, the printer driver removes some data so that the data newly acquired does not overlap the data having been acquired in the past, to remove the data redundancy (Step S53).

Once the history data is updated correctly, the printer driver takes a tally of the usage history again (Steps S54 and S55). In this process, the printer driver takes the tally of the usage history of the entire period by the user, or the tally of the usage history across a predefined period (such as the most recent one month), with such a period being a range in which the usage of the multifunction peripheral 120 from the past to now is known. The statistical processing is mainly determined based on the last usage time and date, and the total usage count. It is also possible to make the determination based only on the last usage time and date; however, the usage count is also considered as an additional condition because there are some cases in which a plurality of devices have been used up to the same time on the same date.

Once the usage history and the result of the statistics processing are updated, and the devices with higher ratios of usage by the user are extracted, these results are displayed in the GUI screen (Step S56), and presented to the user. The GUI screen displays the devices in a manner sorted in the reversed chronological order of the last usage time and date, and the descending order of the usage count, but the devices can instead be sorted by the time and date/usage count so that the user can better determine. When the device information (MIB information on the devices) is being acquired on the background, the GUI display is also updated every time the device information is acquired (Step S57). Updated is, however, only the information on the multifunction peripheral 120 having been selected by the user in the GUI screen, and the information on the unselected multifunction peripherals 120 is retained as internal data.

The printer driver acquires the MIB information on the multifunction peripherals 120 as a background process (Steps S58 to S61), and updates the display in the GUI screen and the internal data every time the information is acquired (Step S62).

When the user selects a particular multifunction peripheral 120 from the list of history of usage by the user, displayed in the GUI screen, the printer driver acquires the MIB information on the multifunction peripheral 120 at that timing (Steps S63 to S68). Because several ten seconds to one minute, for example, is required to acquire the MIB information depending on the conditions of the network, the printer driver displays, during such a period, a message indicating that the information is being updated in the GUI.

The MIB information on the multifunction peripheral 120 to be displayed in the GUI is presented in a format enabling the user to easily get a grasp of the conditions of the multifunction peripheral 120 at the time at which such information is acquired. This format is configured to provide information such as: another user is current printing, a failure has occurred, and the immediate availability by the user, for example to enable the user to immediately determine whether the user can output a print from the multifunction peripheral 120.

The user is then enabled to select a multifunction peripheral 120 that is currently available, and that is frequently used by the user via the GUI screen (Step S69).

The LF management server 100 tests the reachability of the multifunction peripherals 120 registered in the history information regularly (e.g., at one o'clock every night). The reachability is tested because there are some factors making the multifunction peripherals 120 to become unreachable, such as a replacement of the device, an update in the IP address, and disconnection of the network. In such a case, by causing the LF management server 100 to confirm the reachability of the multifunction peripherals 120 regularly (Step S70), unreachable multifunction peripherals 120 can be excluded in the statistical processing.

FIG. 11 is a schematic view for explaining an exemplary GUI screen of the printer driver on the user PC 110. When the user issues a printing instruction from some application such as text editor software, the user can display the GUI screen of the printer driver. The GUI of the printer driver includes a screen for displaying the current conditions of the multifunction peripherals previously used by the user, as well as general printing settings, and can be caused to be displayed by a user at any timing.

When the user displays the screen illustrated in FIG. 11, the usage history data of the multifunction peripherals 120 having been already acquired at the point in time (the table in the upper area of the GUI screen) is displayed. What is displayed here is a list of the multifunction peripherals 120 previously used by the user, and this list can present the usage count, the IP address, and the current reachability status of each of the multifunction peripherals 120.

When the user selects a particular multifunction peripheral 120 on the GUI screen, the printer driver acquires the MIB information on the multifunction peripheral 120 at the time of the selection. It is however also possible to acquire the MIB information at the timing at which the history list in the upper area of the GUI screen is created on the background, in order to improve the response speed to the user. In such a case, because there might be a discrepancy in the MIB information with respect to the real-time MIB information, the printer driver is enabled to acquire the MIB information again if a certain period (for example, one minute or so) has elapsed from the last acquisition of the MIB information.

A computer program executed on the information processing apparatus and the information processing system according to the embodiment is provided in a manner embedded in the memory unit 102, 112, for example. The computer program may also be provided in a manner incorporated in a computer-readable recording medium such as a compact disc read-only memory (CD-ROM), a flexible disk (FD), a compact disc recordable (CD-R), and a digital versatile disc (DVD), as a file in an installable or executable format.

Furthermore, the computer program executed in the embodiment may be stored in a computer connected to a network such as the Internet, and may be available for download over the network. Furthermore, the computer program executed in the embodiment may be provided or distributed over a network such as the Internet.

The computer program executed in the embodiment has a modular structure including the units described above. As actual hardware, the CPU (processor) 101, 111 reads the computer program from the memory unit 102, 112 and executes the computer program to load and generate the units described above onto the main memory.

According to an embodiment, an information processing apparatus, an information processing method, a recording medium, and an information processing system capable of notifying the availability of an image forming apparatus, and improving the efficiency of LF printing can be provided, advantageously.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. An information processing apparatus comprising:
a memory storing computer-readable instructions; and
a processor configured to execute the computer-readable instructions to,
acquire, from a server, usage history information accumulated in the server, the acquired usage history information including a list identifying a plurality of image forming apparatuses previously utilized by a user to generate print outputs, and a last usage time and date for each of the plurality of image forming apparatuses;
calculate a usage count identifying a number of times the user has previously utilized each of the plurality of image forming apparatuses, and extract at least one image forming apparatus with a high usage count and a recent last usage time and date, based on the acquired usage history information;
cause a list of the extracted at least one image forming apparatus to be displayed via a display unit, the displayed list of the extracted at least one image forming apparatus being sorted according to most frequent use by the user based on the last usage time and date and the calculated usage count;

receive, via the display unit, a selection by the user of an image forming apparatus, to which print data is to be output, from the displayed list of the extracted at least one image forming apparatus;

acquire, directly from the selected image forming apparatus, device information indicating a current availability condition of the selected image forming apparatus in response to receiving the selection by the user; and cause the acquired device information to be displayed via the display unit to enable the user to determine whether to output the print data to the selected image forming apparatus based on the current availability condition of the selected image forming apparatus.

2. The information processing apparatus according to claim 1, wherein the processor is further configured to execute the computer-readable instructions to, acquire device information from the extracted at least one image forming apparatus in response to receiving a notification of the device information from the server, and cause the acquired device information of the extracted at least one image forming apparatus to be displayed via the display unit.

3. The information processing apparatus according to claim 1, wherein the processor is further configured to execute the computer-readable instructions to, acquire, in response to a time period from a time of last acquisition of usage history information from the server to a current time being equal to or longer than a predetermined time period, long-term usage history information from the server in a manner in which the long-term usage history information is divided into one or more units of usage history information according to the predetermined time period, and the one or more units of usage history information are acquired from the server separately, and merge the acquired long-term usage history information from the server, with stored usage history information having already been accumulated in the information processing apparatus, while avoiding duplication in the stored usage history information by removing any redundancies in the acquired one or more units of usage history information, to generate merged usage history information.

4. The information processing apparatus according to claim 3, wherein the processor is further configured to execute the computer-readable instructions to re-calculate the usage count identifying the number of times the user has previously utilized each of the plurality of image forming apparatuses, and extract one or more image forming apparatuses with a high usage count and a recent last usage time and date, based on the merged usage history information, and the displayed list of the extracted at least one image forming apparatus includes at least one image forming apparatus that is reachable, and excludes any image forming apparatus that is unreachable, among the extracted one or more image forming apparatuses.

5. An information processing method comprising:

acquiring, from a server, usage history information accumulated in the server, the acquired usage history information including a list identifying a plurality of image forming apparatuses previously utilized by a user to generate print outputs, and a last usage time and date for each of the plurality of image forming apparatuses;

calculating a usage count identifying a number of times the user has previously utilized each of the plurality of image forming apparatuses, and extracting at least one image forming apparatus with a high usage count and a recent last usage time and date, based on the acquired usage history information;

causing a list of the extracted at least one image forming apparatus to be displayed via a display unit, the displayed list of the extracted at least one image forming apparatus being sorted according to most frequent use by the user based on the last usage time and date and the calculated usage count;

receiving, via the display unit, a selection by the user of an image forming apparatus, to which print data is to be output, from the displayed list of the extracted at least one image forming apparatus;

acquiring, directly from the selected image forming apparatus, device information indicating a current availability condition of the selected image forming apparatus in response to receiving the selection by the user; and causing the acquired device information to be displayed via the display unit to enable the user to determine whether to output the print data to the selected image forming apparatus based on the current availability condition of the selected image forming apparatus.

6. A non-transitory recording medium including a computer program causing a computer to perform the information processing method according to claim 5.

7. An information processing system comprising:

at least one information processing apparatus;

a plurality of image forming apparatuses; and a server configured to manage the plurality of image forming apparatuses, and to accumulate usage history information on print outputs, and the at least one information processing apparatus comprising a memory storing computer-readable instructions and a processor configured to execute the computer-readable instructions to, acquire, from the server, the usage history information accumulated in the server, the acquired usage history information including a list identifying a plurality of image forming apparatuses previously utilized by a user to generate the print outputs, and a last usage time and date for each of the plurality of image forming apparatuses previously utilized by the user;

calculate a usage count identifying a number of times the user has previously utilized each of the plurality of image forming apparatuses, and extract at least one image forming apparatus with a high usage count and a recent last usage time and date, based on the acquired usage history information;

cause a list of the extracted at least one image forming apparatus to be displayed via a display unit, the displayed list of the extracted at least one image forming apparatus being sorted according to most frequent use by the user based on the last usage time and date and the calculated usage count;

receive, via the display unit, a selection by the user of an image forming apparatus, to which print data is to be output, from the displayed list of the extracted at least one image forming apparatus;

acquire, directly from the selected image forming apparatus, device information indicating a current availability condition of the selected image forming apparatus in response to receiving the selection by the user; and cause the acquired device information to be displayed via the display unit to enable the user to determine whether to output the print data to the selected image forming apparatus based on the current availability condition of the selected image forming apparatus.

* * * * *